United States Patent

Van Der Veer

[15] 3,690,180
[45] Sept. 12, 1972

[54] DREDGER VESSEL AND A METHOD OF DETERMINING THE LOADED WEIGHT OF SEDIMENTED MATERIAL IN A DREDGER VESSEL

[72] Inventor: Romke Van Der Veer, Jutphaas, Netherlands

[73] Assignee: N.V. Ingenieursbureau voor Systemen en Octrooien "Spanstaal", Rotterdam, Netherlands

[22] Filed: Jan. 30, 1970

[21] Appl. No.: 7,012

[52] U.S. Cl. .................... 73/432 R, 73/294, 73/438
[51] Int. Cl. .......................... G01f 23/14, G01n 9/04
[58] Field of Search ...... 73/299, 302, 438, 61, 432 R; 177/207

[56] References Cited

UNITED STATES PATENTS 1,621,535  3/1927  Haultain ..................... 73/438
1,987,988  1/1935  Brown ........................ 73/299

Primary Examiner—Louis R. Prince
Assistant Examiner—Denis E. Corr
Attorney—Imirie, Smiley, Snyder and Butrum

[57] ABSTRACT

When measuring the quantity of sand in a dredger vessel which sand is sedimented from a suspension of sand and water, the height of the sedimented sand is determined by means of inaccurate mechanical sensitive means acting on the surface of the sedimented sand. An accurate method of measuring is provided in which fluid, such as water, is so fed at pressure, into the hold at at least one measuring place provided in said hold, that the fluid fluidizes the compacted material sedimented at the measuring place, the pressure at the measuring place being picked up when said material is in fluidized state, so that the pressure picked up corresponds with the weight of the column of dredger spoil and water, from which the weight of the loaded material at the measuring place is derived.

30 Claims, 5 Drawing Figures

DREDGER VESSEL AND A METHOD OF DETERMINING THE LOADED WEIGHT OF SEDIMENTED MATERIAL IN A DREDGER VESSEL

The invention relates to a method for determining the weight of material sedimented from a suspension of water and material, such as dredger spoil, in the hold of a dredger vessel. The invention also relates to a dredger vessel for the performance of a method of the kind specified.

In the prior art method the upper limit of the sedimented material is determined by letting down into the hold a measuring strip with a transverse plate, the depth of immersion of the measuring coarse being read off, coarse upper limit being calculable therefrom. An idea of the loading distribution, from which the quantity of sedimented material can be calculated, can be obtained by letting the measuring strip down into the hold at a number of places.

Although this method is inaccurate, since the measuring strip can of course never be let down precisely vertically, the readings never being precise, it can be used for defining the clear upper limit of course material, such as course sand, gravel and the like. In contrast, it cannot be satisfactorily used for determining the correct upper limit of fine sand, which remains in suspension for a long time. Since often invoicing is based on measurements of this kind, considerable inaccuracy of the kind described is really unacceptable.

Attempts have therefore been made to measure the actual height by pressure pick ups built into the hold, but without satisfactory results. When the sand sinks, it becomes compacted by the tension of the grains, the resulting compacted material resting against the bottom of the hold. The pressure pick ups then of course pick up the hydrostatic pressure of the associated water column. To solve this problem according to the invention fluid, such as water, is so fed at pressure into the hold at at least one measuring place provided in said hold, that the fluid fluidizes the compacted material sedimented at the measuring place, the pressure at the measuring place being picked up when said material is in fluidized state, so that the pressure picked up corresponds with the weight of the column of dredger spoil and water, from which the weight of the loaded material at the measuring place is derived.

Preferably in the method according to the invention the pressure at the measuring place is picked up by a pressure pick up connected to a fluidizing fluid pipe which feeds the fluidizing fluid into the hold at the measuring place. Laboratory tests have surprisingly shown that even if very little water is supplied (about half a liter per minute) at a rather very high pressure (about 15 m water column), the tension between the grains of sand completely breaks up and a fluidized column is produced at the measuring place.

To determine the loaded height of dredger spoil, the water level in the hold must be known. It is true that the water level is constant in vessels having an overflow, but the position of the overflow in relation to the water level changes due to the rolling and pitching of the vessel, so that the water level is not always known with the same degree of accuracy, and this makes the determination of the loaded height of dredger spoil rather less accurate. For this reason, in a preferred embodiment of the method according to the invention the pressure is picked up at a second measuring place, which is disposed above the first measuring place and above the sedimented material, but below the water level, and the loaded height of dredger spoil between the two measuring places is derived from the difference in pressure therebetween.

Since measurements are made at both the bottom and top of the hold, the variation in the pressure difference gives the actual column pressure of the weight of the material, since the associated water column has a constant value. After calibration, therefore, the load of sand or similar solids between the measuring places can be read off. The readings from a number of first measuring places can be transmitted in a very simple manner to indicators so as to give an idea of the distribution of loading. The readings at all the measuring places can then also be fed to a computer unit which calculates the total load of sand or the like, determines the loading speed and transfers such data to indicating and recording systems.

IN a further preferred embodiment, the valve-operating devices of the loading pipe can be so operated by the computer, on the basis of the data collected, that uniform loading is achieved.

One snag in automation is the pressure pick ups, which easily get clogged and are then inoperative. To obviate this disadvantage, in a further preferred embodiment of the invention the number of pressure pick ups is strictly limited, and the pipe system has a calibrated position, so that a reserve pressure pick up is switched in automatically, for instance, if a pressure pick up gets clogged. The measuring pipes can also act as purgative pipes, measuring being performed by the use of three-way valves when the water is stationary in the measuring pipe.

Moreover, in this preferred embodiment, a number of draught meters are also included in the pipe system.

These and other features of the invention will now be described with reference to the drawings, wherein.

Figure 1:
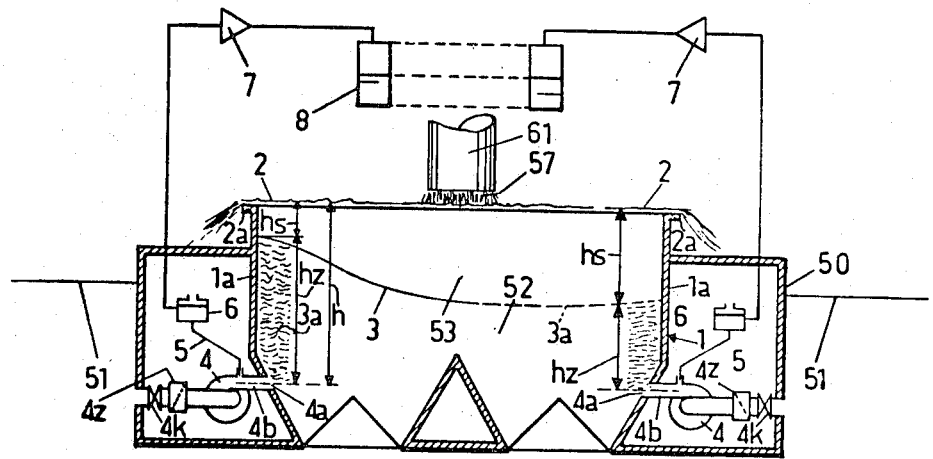
FIG. 1 shows diagrammatically an apparatus for the performance of the method according to the invention.

Referring to FIG. 1, a vessel 50 has a hold 1 having walls 1a. A suspension 57 of sand and water is loaded into the hold 1 from a loading pipe 61. The water level 2 in the hold 1 is determined by an overflow edge 2a, the sedimented sand or other dredger spoil having any particular upper surface 3. A pipe 4b for fluidizing fluid extends into the hold 1 at each of a plurality of measuring places 4a (only two shown). Each pipe 4b is connected to the delivery side of a pump 4 sucking in water 51 from outside via a valve 4k and a filter 4z. A pressure pick up 6 is connected via a scanning pipe 5 to the pipe 4b adjacent the measuring place 4a. When sand 52 in the hold 1 is completely compacted, the fluid in the pipe 4b is stationary and when there is water 53 above the sand 52, the pick up 6 picks up the pressure of a water column $h$ at the measuring place $4a$. However, it has surprisingly been found that the pumping of water at a very low delivery rate, for instance half a liter per minute per measuring place, but at a relatively high pressure, for instance 15 m water column, breaks down the tension between the grains of the moist, compacted sand, so that a column $3a$ of fluidized sand is produced above the measuring place $4a$. The pressure of the fluidizing fluid flowing through the pump 4 past the measuring place $4a$ is then equal to the pressure in the hold 1 at the measuring place $4a$, as a result of the head $h$ of the column of fluidized sand $3a$ and the head $h_s$ of the suspension of sand and water above the fluidized sand. The pressure due to these heads is equal to the value picked up by the associated pressure pick up 6, the value being transmitted, after amplification in an amplifier 7, to indicating and recording apparatus 8.

Figure 2:
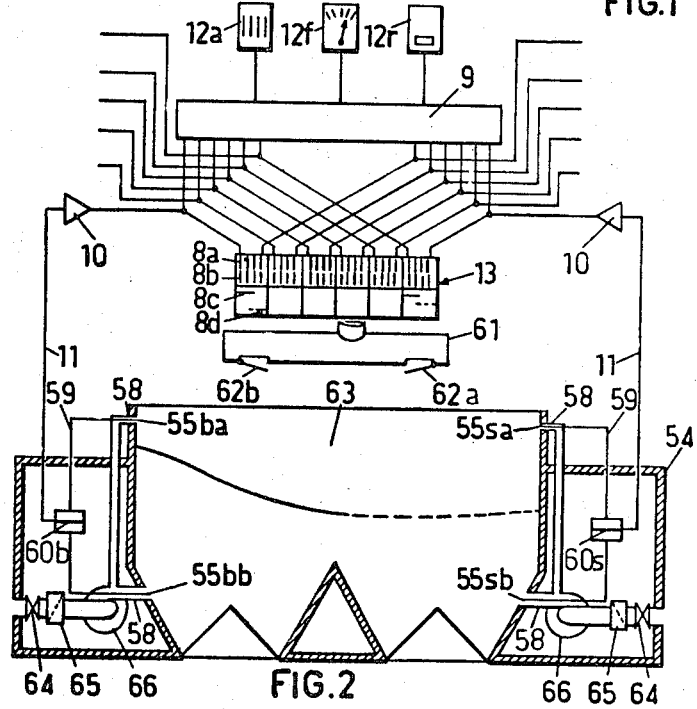
FIG. 2 shows diagrammatically a preferred embodiment of the apparatus for the performance of the method according to the invention.

FIG. 2 shows a vessel 54 having a further developed measuring system. First measuring places $55sb$; $55bb$ and two measuring places $55sa$; $55ba$ are disposed in pairs above one another, so that there is always a constant distance between the first and second measuring places. Fluidizing fluid pipes 58 are disposed concentrically around scanning pipes 59. By connecting the scanning pipes 59 of each two measuring places disposed one above the other to one and the same pressure pick up, a difference in pressure can be measured which corresponds to a column of solid material between such measuring places, while the weight of the water between the measuring places is compensated by the weight of the water in the scanning pipes, thus simplifying the further processing of the results measured.

Figure 3:
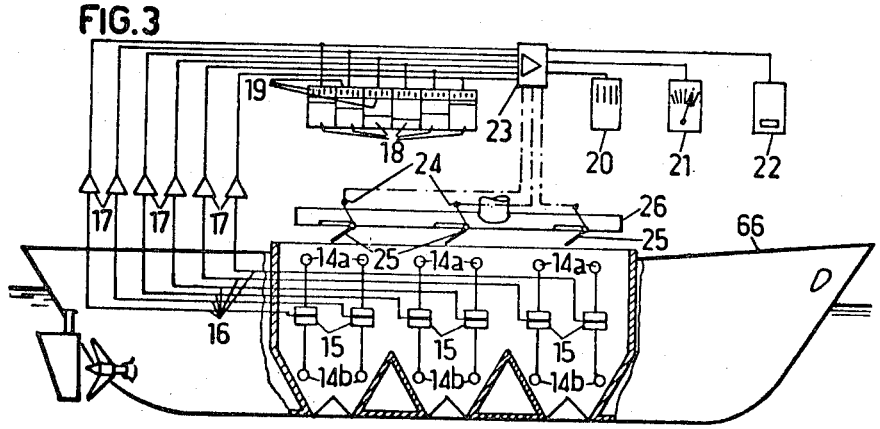

FIG. 2 also shows clearly the separate indication for the port and starboard sides, showing whether a suspension of sand and water fed from a loading pipe 61 should be poured into hold 62 via valve $62b$ and/or valve $62s$. The fluidizing water is supplied from outside by pumps 66 via valve 64 and filters 65. The scanning pipes 59 bring the pressure of the measuring places to either side of diaphragm pressure pick ups $60s$; $60b$. The deflections of the diaphragms, representing a difference in pressure, are transmitted electrically via lines 11 to amplifiers 10, whereafter the amplified signal of the starboard and port sides are supplied to an indicator 13 which is subdivided in this embodiment into a starboard digital counter $8a$, a port digital counter $8b$, a starboard indicator $8c$ and a port indicator $8d$. The indication of the results measured at various places (in the embodiment illustrated six places) gives an idea of the distribution of the load in the hold 63, while a computer 9 determines the weight of the total load of solids, by the introduction into the computer 9 of the details from the various measuring places in the hold 63. This amount of solids (sand) is indicated on an indicator $12a$ and/or a recording apparatus $12r$, while the loading speed of the dry material is known on a loading-speed meter $12f$. The computer 9 also delivers control pulses for the valves $62b$; $62s$ of the filling pipe 61 of the hold-loading installation, uniform loading being therefore automatically achieved on the basis of the measurement. There is no need to emphasize that this method of measuring, recording and regulation is very important more particularly in closed holds, or on vessels having a number of holds. FIG. 3 shows diagrammatically, by way of example, merely the starboard side of a vessel 66 with the associated lines of the measuring apparatus. In the embodiment illustrated in FIG. 3, the information supplied from the starboard and port sides to the computer 23 is kept separate. The system of fluidizing fluid pipes is omitted from FIG. 3 for the sake of simplicity. A number of measuring places $14a$; $14b$ are shown which are connected to pressure-difference pick ups 15 electrically connected via lines 16 to amplifiers 17, which supply the amplified signal to starboard digital indicators 18 and position indicators 19, the pressure-difference pick ups 15 also being connected to the computer 23 which also receives the signals from the port amplifiers (not shown) and delivers pulses to the recording apparatus 22, loading-speed meters 21 and solid-loading meter 20, and to the actuating members 24 of the valves 25 and of the loading pipe 26.

The embodiments shown in FIGS. 2 and 3 are not yet entirely suitable for complete automation, since disturbances may occur, but they are suitable for semi-automatic operation, and this in itself is a considerable advance.

Figure 4:
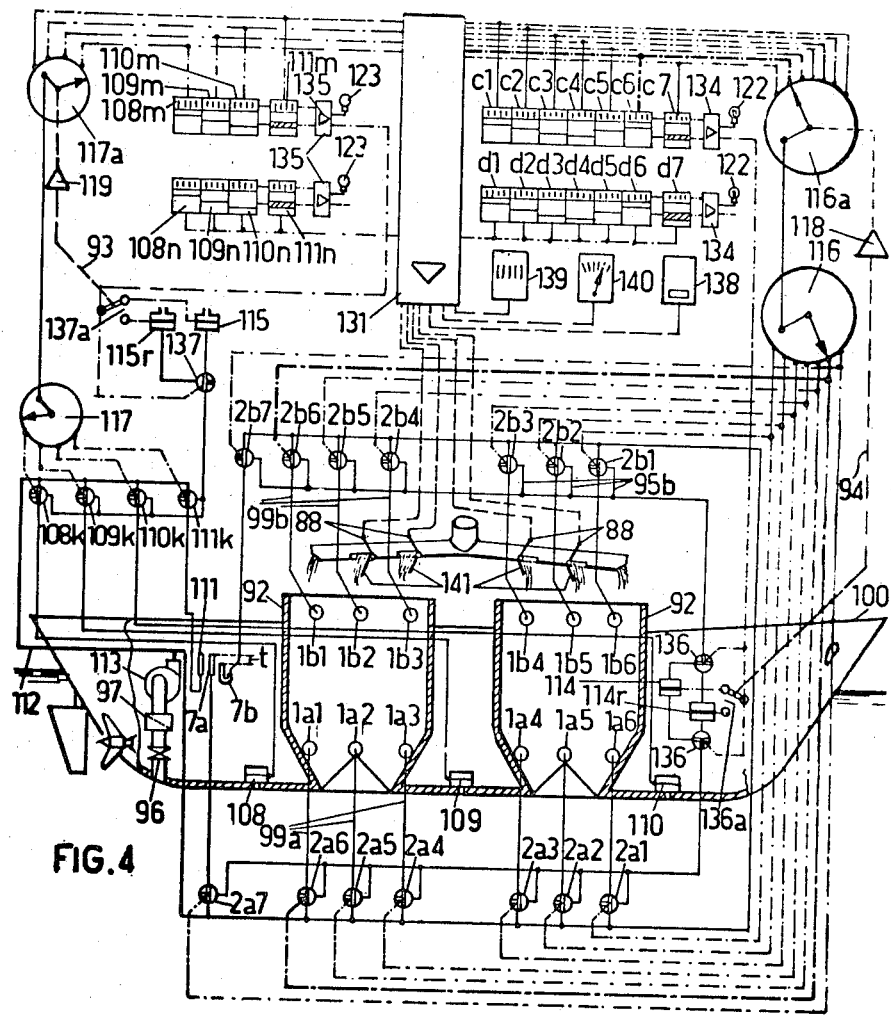
FIGS. 3 and 4 show diagrammatically further developed embodiments of the apparatus for the performance of the method according to the invention.

In the vessel 100 shown in FIG. 4 the intention is to achieve complete automation by the use of an automatic system for switching in reserve apparatus if disturbances occur, and also by including draught meters in the pipe system. The vessel 100 has two holds 92 containing measuring places $1a1 - 1a6$; $1b1 - 1b6$, disposed, in the example illustrated, one the star-board side. Pressure pick ups 108 – 110 of the draught meters are disposed at the bottom of the ship 100. Calibration tubes $7a$, $7b$ and 111 are provided; the tubes $7a$, $7b$ produce a constant pressure difference $t$; one single calibration tube 111 is enough for the draught meters.

To make the drawing clearer, the pipe system of the draught meter and the loading meter are shown separately, but both systems can be combined into a single system.

A pump 113 pumps water, sucked in from outside via filter 97 and valve 96, through pressure lines 112 and three-way taps remote-controlled by a programme to the measuring places, namely via three-way valves $2a1 - 2a6$ and $2b1 - 2b6$ to measuring places $1a1 - 1a6$ and $1b1 - 1b6$ respectively, via three-way valves $2a7$ and $2b7$ to calibration tubes $7a$ and $7b$ respectively, via three-way valves $108k - 110k$ to pressure pick ups 108 – 110 and via three-way valve $111k$ to calibration tube 111. The pressure pick ups 114 or $114r$ and 115 or $115r$ then sense a pressure in the afore-mentioned three-way valves, such pressure being equal to, substantially equal to, or at least dependent on the pressure of the associated measuring places. The remote-controlled three-way valves are individually switched by switches 116, 117 out of the inoperative scavenging position into the measuring position. After measurement, each three-way valve automatically returns to its scavenging position. The measuring signals delivered by the pressure pick ups 114 or $114r$, 115 or $115r$ via measuring wires 94, 93, amplifiers 118 and 119 and switches $116a$, $117a$ operating synchronously with switches 116, 117 are individually transmitted to indicators $c1 - c7$ and $108m - 111m$ respectively and to computer unit 131, which also receives the information delivered by the port pressure pick ups to indicators $d1 - d7$ and $108n - 111n$.

Since a calibration position is passed once during each measuring cycle, as shown on indicators $c7$ and $111n$, the pressure pick ups may be observed to give a wrong indication. Moreover, a safety circuit is provided, within limits of tolerance to be determined, which ignites a light source 122, 123 to signal that the tolerance has been exceeded and also acts via amplifiers 134, 135 to actuate changeover switches 136, 136a, 137, 137a and switch in reserve pressure pick ups 114r, 115r.

Since the information from the various measuring places in the hold are supplied to the computer unit 131 separately, the computer unit 131 can deliver pulses for controlling the actuating members 88 of the loading valves 141, so that the holds 92 are loaded uniformly.

From the information supplied by the loading meters and that supplied by the draught meters, the computer 131 calculates the total amount of sand and the speed at which the sand is introduced into the holds; this information can be read off on recording indicator 138, digital indicator 139 and loading-speed meter 140. Clearly, the data of the loading-speed meter can be used for adjusting the concentration in the suction pipe of the suction dredging installation loading the vessel, the speed of a trailing hopper dredger, or similar mechanisms influencing loading.

Figure 5:
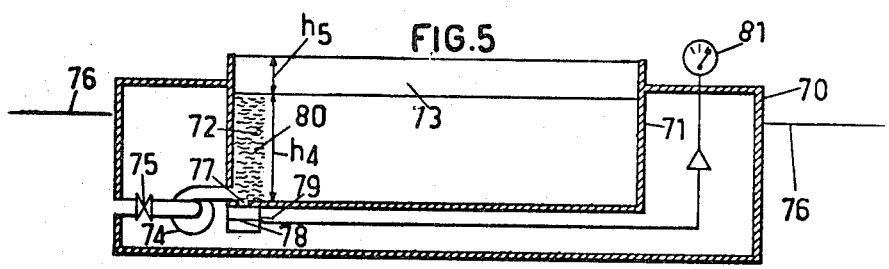
FIG. 5 shows a vessel for the performance of an elementary method according to the invention.

The vessel 70 shown in FIG. 5 has a hold 71 receiving sedimented sand 72 and water 73. A pump 74 pumps water 76 from outside via valve 75 into the hold 71 at measuring place 77, where the steel measuring diaphragm 78 of a pressure recorder 79 is disposed. The water supplied from outside fluidizes a column of sand 80, and the pressure pick up senses a pressure composed of a column $h_4$ of fluidized sand and a column $h_5$ of water. The height of the column $h_4$ can be derived from the measured value read off on an indicator 81 connected via an amplifier to the pressure recorder 79.

What I claim:

1. A method of determining the amount of material, such as dredger spoil, contained in the hold of a vessel, at least a part of said material being sedimented from a suspension of water and said material, comprising the steps of:
    a. feeding fluid, such as water, under pressure into the hold at at least one measuring place below the surface of said material for rendering fluid a column above said measuring place wherein all of said material is made into a fluid suspension including a column of the sediment so that the pressure at said measuring place corresponds to the weight of the fluid material and the water above said measuring place,
    b. sensing the pressure at the measuring place when said column of material is in fluid state, and
    c. determining the amount of material contained in the hold of the vessel from the pressure sensed in step (b).

2. A method as claimed in claim 1 including, during step (b), sensing the pressure at a second measuring place which is disposed above the first measuring place and above said column of fluid material, but below the water level, and wherein the determination of step (c) is derived from the difference in pressure between said first and said second measuring places.

3. A method as claimed in claim 1, characterized in that the local loaded height of dredger spoil is determined at a number of measuring places on both the starboard and port sides of the vessel, at a number of locations distributed over the length of the hold, such height being fed to an indicator which indicates the distribution of the loaded height of dredger spoil over the hold.

4. A dredger vessel comprising, in combination:
    a buoyant hull having a hold into which a suspension of dredger spoil and water is to be discharged whereby the dredger spoil settles and compacts therewithin;
    means for rendering fluid a column of compacted dredger spoil above a selected measuring place within said hold so that the pressure at said measuring place is indicative of the height of said column above said measuring place; pressure pick-up means for sensing the pressure at said measuring place; and
    means for determining the height of said column above said measuring place from the pressure sensing by said pressure pick-up means.

5. A dredger vessel as claimed in claim 4, characterized in that said means for rendering fluid comprises a source of pressurized fluid and a pipe leading from said source to said measuring place, said pressure pick up means being connected to said pipe.

6. A dredger vessel as claimed in claim 4 wherein said pressure pick-up means also senses pressure at a second measuring place which is disposed above the first measuring place, and said means for determining determines the weight of said column from the pressure difference of pressures at said two measuring places.

7. A dredger vessel as defined in claim 4 including discharge means for selectively discharging the suspension to a plurality of regions within said hold, one of which is associated with said selected measuring place; means for rendering fluid a column of compacted dredger spoil above a further selected measuring place within each such region, further pressure pick up means for measuring the pressures at said further sensing places; means for determining the weights of the columns above each of said further measuring places from the pressures sensed by said further pressure pick up means; and means for controlling said discharge means to even out the distribution of said dredger spoil within said hold.

8. A dredger vessel as claimed in claim 4, characterized in that a plurality of measuring places are disposed on both the starboard and port sides of the dredger vessel, at a number of locations distributed over each hold, and a load-distribution indicator is used which can indicate the loaded height of dredger spoil at each of the measuring places.

9. A dredger vessel as claimed in claim 8, characterized in that a plurality of measuring places are connected, via tubes having closure valves, to one and the same pressure pick up, and the closure valves are controlled by a programmed switch, while at least one starboard pressure pick up and one port pressure pick up feeds measured results to computer units and indicators.

10. A dredger vessel as claimed in claim 9, characterized in that in addition to the measuring places, calibration places are provided, and at least one reserve pressure pick up is so included in the pipe system that if there has been wrong calibration, a reserve pressure pick up is automatically switched in.

11. A dredger vessel as claimed in claim 8, characterized in that at least one measuring place for picking up the draught is disposed outboard below the water level, such measuring place being also included in the pipe system.

12. A dredger vessel as claimed in claim 8, characterized in that a plurality of valves are disposed on a dredger loading pipe, the valves being controllable by the measured values or signals from the pressure pick ups.

13. A dredger vessel as claimed in claim 8, characterized in that a computer unit receiving signals from the pressure pick ups feeds a loading-speed meter, so that information is provided about the speed of loading of the dredger spoil, thus enabling determination of the moment when the loading must be stopped.

14. A method for determining the amount of material contained in a container at least part of which material has settled and compacted in the container, comprising the steps of:
  a. feeding fluid under pressure into the container at at least one measuring place provided in said container for rendering fluid a column of the settled and compacted material above the measuring place so that the pressure at said measuring place is indicative of the weight of the grandular material and fluid in said column,
  b. sensing the pressure at the measuring place when said column of material is in fluid state, and
  c. determining the amount of material contained in the container at least in part from the pressure sensing in step (b).

15. A method as claimed in claim 14 including, during step (b), sensing the pressure at a second measuring place which is disposed above the first measuring place and above the column of fluid material, and wherein the loaded height of granular material between the two measuring places is determined in step (c) from the difference in pressure therebetween.

16. A method as claimed in claim 14, wherein the local loaded height of granular material is determined at a number of measuring places divided over the container in horizontal direction, such height being fed to an indicator which indicates the distribution of the loaded height of granular material over the container.

17. In a measuring system, in combination:
  a container having a suspension of grandular material therein from which there is settled and compacted at least a portion of said suspension; is;
  means for rendering fluid a column of settled and compacted material above a selected measuring place within said container so that pressure at said measuring place is indicative of the weight of fluidized material in said column above said measuring place;
  pressure pick-up means for sensing the pressure at said measuring place; and
  means for determining the amount of material contained in the container at least in part from the pressure sensed by said pressure pick-up means.

18. A container as claimed in claim 17, wherein said means for rendering fluid comprises a source of pressurized fluid and a pipe leading from said source to said measuring place, said pressure pick up means being connected to said pipe.

19. A container as claimed in claim 17 including a second measuring place which is disposed above the first measuring place, and said means for determining determines the weight of said column from the pressure difference of pressures at said two measuring places.

20. A container as claimed in claim 17, wherein a plurality of measuring places are distributed in horizontal direction over said container, and a load-distribution indicator is provided indicating the loaded height of granular material at each of the measuring places.

21. A container as claim in claim 20, wherein a plurality of measuring places are connected, via tubes having closure valves, to one each of a plurality of pressure pick up means, and the closure valves are controlled by a programmed switch, while at least one pressure pick up means at either side of the container feeds measured results to computer units and indicators.

22. A container as claimed in claim 21, wherein in addition to the measuring places, calibration places are provided, and at least one reserve pressure pick up is so included in the pipe system that if there has been wrong calibration a reserve pressure pick up is automatically switched in.

23. A container as claimed in claim 20, wherein the container is positioned on a vessel and that at least one measuring place for picking up the draught is disposed outboard below the water level, such measuring place being also included in the pipe system.

24. A container as claimed in claim 20, including a plurality of valves are disposed in a loading pipe, the valves being controllable by the measured values or signals from the pressure pick ups.

25. A container as claimed in claim 20, wherein a computer unit receiving signals from the pressure pick ups feeds a loading-speed meter, so that information is provided about the speed of loading of the granular materials, thus enabling determination of the moment when the loading must be stopped.

26. The method of measuring the height of a body of compacted granular material above a selected measuring point located below the top level of the compacted material, which comprises the steps of:
  a. introducing a flow of fluid into said compacted material at or near said measuring place;
  b. maintaining the pressure of fluid introduction sufficiently high and the flow rate of fluid sufficiently low as to produce a column of fluid material which is localized vertically with respect to said measuring place and which extends upwardly through the compacted material from said measuring place to the top level of said body of compacted material;
  c. sensing the pressure at said measuring place; and
  d. determining the weight of said column from the sensing of pressure of step (c).

27. The method according to claim 26 wherein the container is the hold of a dredging vessel, the compacted material is dredging spoil and said fluid is water, the pressure and flow rate of step (b) being respectively about 15m of water and about half a llter per minute.

28. The method according to claim 27 including the step of sensing the pressure of water at a SECOND measuring place vertically above said first measuring place and determining in step (d) the weight of said column from the difference in pressure between that of step (c) and that of the water at said second measuring place, whereby the determination is independent of changes in the water level in the hold.

29. The method of filling a container with an evenly distributed body of compacted material, which comprises the steps of:
 a. introducing the material to build up the body of compacted material;
 b. introducing a flow of fluid into said compacted material at a plurality of horizontally spaced measuring points within said container and below the top level of said body of compacted material;
 c. maintaining the pressure of fluid introduction sufficiently high and the flow rate of fluid sufficiently low as to produce a localized vertical column of fluid material from each of said measuring places to the top level of the compacted material;
 d. sensing the pressure at each of said measuring places and determining the column heights therefrom; and
 e. controlling the distribution of material introduced in step (a) in accord with the sensed pressures and determinations of step (d) evenly to distribute the body of compacted material within said container.

30. The method according to claim 29 wherein the container is the hold of a dredging vessel, the compacted material is dredging spoil, said fluid is water, and the material is introduced as a suspension of dredging spoil in water is step (a), the pressures and flow rate of step (c) respectively being about 15 m of water and about half a liter per minute.

* * * * *

UNITED STATES PATENT OFFICE
CERTIFICATE OF CORRECTION

Patent No. 3,690,180  Dated Sept. 12, 1972

Inventor(s) Romke van der Veen

It is certified that error appears in the above-identified patent and that said Letters Patent are hereby corrected as shown below:

Inventor's surname is VAN DER VEEN

Foreign Application Priority Data

February 3, 1969  Netherlands  69.01673

Signed and sealed this 23rd day of January 1973.

(SEAL)
Attest:

EDWARD M. FLETCHER, JR.  ROBERT GOTTSCHALK
Attesting Officer  Commissioner of Patents